J. WARD.
APPARATUS FOR MAKING TAR PAVING.
APPLICATION FILED JUNE 11, 1907.

933,803.

Patented Sept. 14, 1909.

2 SHEETS—SHEET 1.

WITNESSES

INVENTOR
James Ward

J. WARD.
APPARATUS FOR MAKING TAR PAVING.
APPLICATION FILED JUNE 11, 1907.

933,803.

Patented Sept. 14, 1909.
2 SHEETS—SHEET 2.

WITNESSES

INVENTOR
James Ward

UNITED STATES PATENT OFFICE.

JAMES WARD, OF GRANGE-OVER-SANDS, ENGLAND.

APPARATUS FOR MAKING TAR PAVING.

933,803.

Specification of Letters Patent. Patented Sept. 14, 1909.

Application filed June 11, 1907. Serial No. 378,368.

*To all whom it may concern:*

Be it known that I, JAMES WARD, a subject of the King of England, residing at Grange-over-Sands, in the county of Lancaster, England, have invented new and useful Improvements in Apparatus for Making Tar Paving, of which the following is a specification.

This invention has reference to the preparation of tar paving material consisting of broken stone and a tar binding substance.

Various kinds of tar—sometimes called "bitumen" paving material for roads, streets, and other surfaces, have been proposed and laid, consisting of screened broken stone of different sizes, and tar or tar compound.

One of the objects of the present invention has been to provide improvements in connection with the preparation of such paving, by which greater uniformity in the preparation, and reliability of the product, may be accomplished; and also to produce a paving of this kind which is completely water-tight.

The invention has further for its object to provide a special manner of supplying the stone of different sized pieces and the tar compound to it, and treating and preparing such tar compound.

The invention is illustrated in the accompanying drawings, in which—

Figures 1, 2:
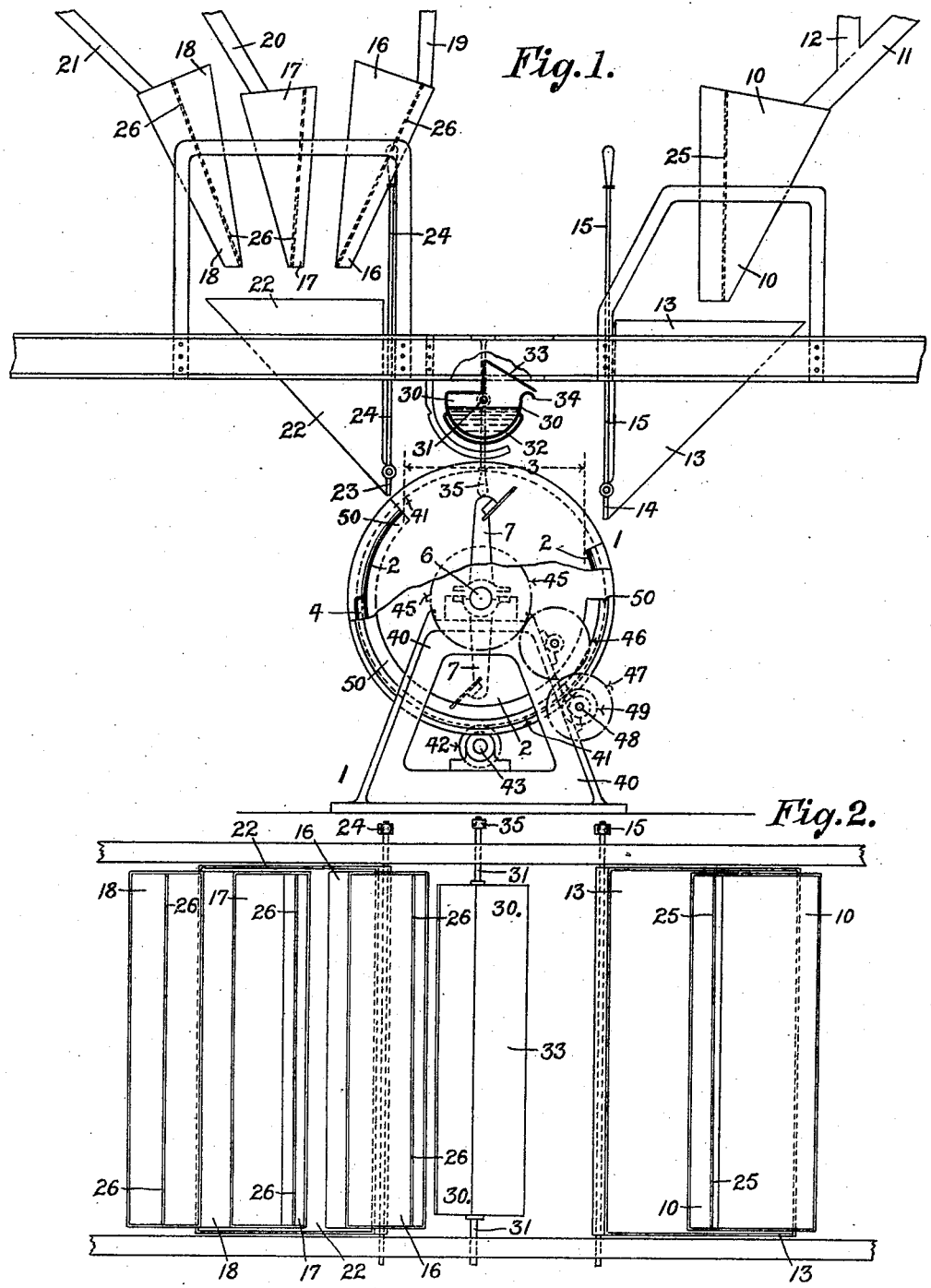
Figure 3:
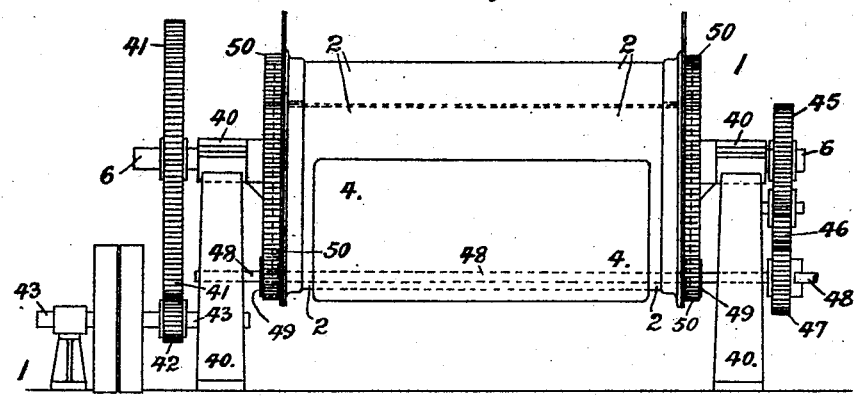
Figure 4:
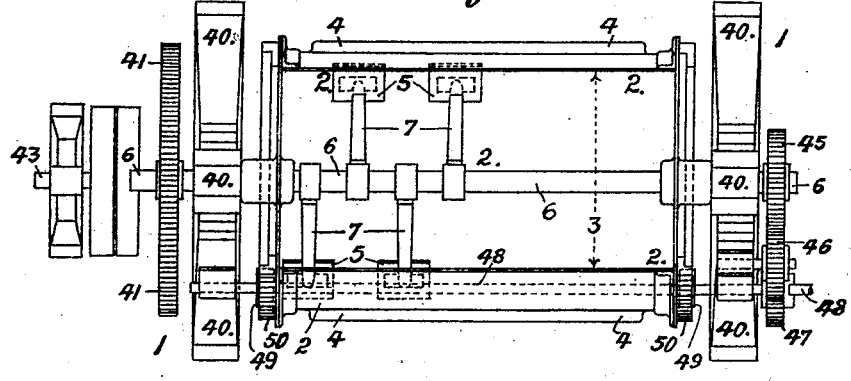

Figure 1 is a side elevation partly in section; Fig. 2 is a plan; Fig. 3 is a side elevation; and Fig. 4 a further plan of the stone feeding and tar covering and mixing machinery; and the invention, so far as this part of it is concerned, is hereafter described with reference to these drawings.

With regard to the manipulation and preparation of the tar, or tar compound, to be used in connection with broken stone for the manufacture of the paving, the following is the improved method of carrying this out:—

The tar, namely "distilled tar", which is used, is taken from the stills, and stored in storage tanks, elevated well above the mixing cylinder—which is shown in the drawings; and the tar is kept heated in these tanks by steam heated coils or other equivalent means, to keep it warm and at the required temperature. This distilled tar is taken off from these tanks, and introduced into a mixing machine suitable for such material, of any known suitable kind, into which limestone or like dust, or equivalent pulverulent or powdery substance is also introduced; such substance being for the purpose of rendering the adhesive and holding properties of the tar greater, and rendering harmless the presence of the lighter oils of the tar—which otherwise would be harmful—and generally strengthening the pavement.

In this mixing machine, the tar and the fine substance are thoroughly mixed together, and made uniform or homogeneous throughout. Then, in connection with this tar compound mixing machine, there is a vessel into which it is run from it—the mixer—and held; and in this vessel there is also an agitator of any known suitable kind, which keeps the tar compound continuously in motion, and homogeneous until it is drawn off and delivered into a tar distributer of the stone preparing machinery, and there actually applied to the entire surface of the stone pieces, by the agitation of the mass of stone and tar.

By the aforesaid mode of manipulating and preparing tar compound, the uniformity of quality or character of the material as above referred to, is accomplished. With regard to the broken stone used, this may consist of several different grades or sizes of pieces.

Referring now to the drawings, 1 generally designates the machine by which the various grades of stone are covered over their entire surface with the tar compound, and mixed and rendered uniform in quality all over.

This machine comprises a cylinder 2 of considerable length, open across the line 3 from end to end, which forms a continuous mouth to it; and outside the cylinder is a space or jacket 4, into which steam is introduced for heating the cylinder, and keeping the stone and tar compound warm while mixing.

The mixing is effected by a number of blades or shovels 5 inclined in the direction shown, and each carried on an arm 7 fixed upon a central shaft 6, which is rotated during the mixing operation—at which time the opening 3 is uppermost. The broken stone is conveyed to and held by a plurality of measuring hoppers shown above the mixer 1, namely, the larger grade is held in the hopper 10, to which it is supplied by chutes 11, 12; and from this measuring hopper it is supplied to the main feeding hopper 13, and thence to the mixer 1; this feeding hopper having a hinged flap valve upon it at its lower end, operated by a lever 15, by which it is opened and closed. The measuring hopper 10 has a movable or adjustable plate 25 within it, whereby its capacity can be varied by moving this plate further inward or outward, and fixing it there, by any known suitable adjustable fastening means. Other grades of stone of various sizes are measured in measuring hoppers 16, 17 and 18, to which the material is supplied through spouts 19, 20 and 21, respectively; each of these hoppers having an adjustable movable plate 26 similar to the plate 25, for varying the capacity of these hoppers, and the quantities which they will deliver as may be required; and such hoppers will be provided with valves such as sliding doors, or the like, for holding up the material while being filled, and before discharging into the hoppers below. Below these measuring hoppers 16, 17, 18, is a main delivery hopper 22, opposite the hopper 13, into which the several grades of stone from them fall, it having an opening and closing flap valve 23 at its lower end, operated by a lever 24.

The tar compound distributer is designated 30, and consists of a trough-shaped vessel hinged by hinges 31 at each end, and extending the full length of the mixing cylinder 2. It has also a jacket 32, to which steam is supplied, for keeping the tar warm and fluid within it, after it is supplied from the tar compound containing vessel above specified. The distributer 30 is provided with a cover 33 of the form shown, and the right hand side of it extends out over a continuous curved lip 34 on the trough or vessel 30, between which a space is left for the discharge of tar; and this space between the lip 34, and the edge of the inclined part of the cover 33, forms a continuous pouring spout, by which construction an even and clean supply in the form of a sheet stream, and distribution of tar, into the cylinder 2, is accomplished. When supplying this tar to the cylinder 2, the distributer 30 is turned 90° by a handle 36, so that the pouring spout portion 34 will be at the lowermost point, and the continuous sheet stream delivery of tar downward into the mixer—which will be in operation—onto the stone mixture—which is being turned over and stirred—takes place.

By arranging two sets of blades on each side of the shaft all in line, and in an inclined position, they mix the tar compound, and various sizes of stone thoroughly, without disturbing the general localities of the several portions of the mass, and not so as to feed the materials from one end to the other; and hence the required proportions are preserved over the whole mass, and the stirrings and turnings at all points are limited to the local action of the several blades at those points or localities; and by making the blades inclined, the material is lifted up by them, and when they reach a certain point, it falls off them over their inner edges, back into that part of the vessel from which it was taken.

During the time the mixing is taking place the opening 3 is at the highest point in the cylinder, the turning over and mixing blades being revolved by a spur wheel 41 on the shaft 6—which is mounted in bearing frames 40—driven by a spur pinion 42 and driving shaft 43.

When the coating of the stone with tar is thoroughly effected all over, the cylinder 1 is revolved until the opening 3 is below, when the contents fall out onto a suitable surface or place of reception; the turning over of the cylinder being effected through a spur wheel 45 fixed on the shaft 6, the spur wheel 46, spur wheel 47 on the shaft 48, and two pinions 49 on the shaft 48 engaging with the circular racks 50 on the two ends of the cylinder. Of these wheels, 47 is loose on the shaft 48, and motion is transmitted through this train of wheels 45, 46 and 47 by a clutch of any suitable kind connected with the shaft 48, which can be thrown into and out of engagement with the hub of the wheel 47. When it is thrown in, the shaft 48 is revolved, and when it is thrown out, the train of wheels revolve idly. The tarred and prepared material thus produced, having the different grades of broken stone, is laid down in the usual way of tar paving, and rolled in hard.

What is claimed is:—

1. In apparatus for making tar paving, a mixing cylinder, main feed hoppers, a plurality of adjustable measuring hoppers, and a vessel having an elongated opening extending from end to end, for holding heated tar, and distributing the same in the form of a sheet stream to the mixing cylinder.

2. In apparatus for making tar paving, a mixing cylinder, main feed hoppers, a plurality of adjustable measuring hoppers, and a rotatable jacketed vessel having an inclined cover, and a curved lip, with a space between the cover and the lip, extending the whole length of the vessel, for heating and distributing tar compound to the mixing cylinder.

3. Apparatus for making tar paving, comprising a mixing cylinder provided with rotatable mixing arms, a partially rotatable jacketed vessel arranged over the mixing cylinder having an elongated outlet, for holding a tar compound in a warm liquid state, and for distributing it in the form of a sheet stream to the mixing cylinder, main feed hoppers arranged above and on each side of the mixing cylinder, a plurality of adjustable measuring hoppers for delivering into the main feed hoppers, and chutes for delivering into the said measuring hoppers.

In testimony whereof I have signed my name to this specification in the presence of two subscribing witnesses.

JAMES WARD.

Witnesses:
    WILFRED M. VERDON,
    GEO. LELLAND.